(12) United States Patent
El-Batal et al.

(10) Patent No.: US 6,987,674 B2
(45) Date of Patent: Jan. 17, 2006

(54) DISK STORAGE SYSTEM WITH REMOVABLE ARRAYS OF DISK DRIVES

(75) Inventors: Mohamad El-Batal, Westminster, CO (US); Bret Weber, Wichita, KS (US); Mark Nossokoff, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/660,887

(22) Filed: Sep. 12, 2003

(65) Prior Publication Data

US 2005/0057909 A1 Mar. 17, 2005

(51) Int. Cl.
*H01R 12/16* (2006.01)
*H05K 7/16* (2006.01)

(52) U.S. Cl. .................. 361/788; 361/685; 361/727; 361/785; 361/796

(58) Field of Classification Search ........ 361/683–686, 361/725–728, 785, 788, 796, 797; 439/157; 360/97.01, 97.03; 29/592.1
See application file for complete search history.

(56) References Cited

U.S. PATENT DOCUMENTS 5,506,750 A * 4/1996 Carteau et al. ............. 361/685

* cited by examiner

*Primary Examiner*—Phuong T. Vu
(74) *Attorney, Agent, or Firm*—Cochran Freund & Young, LLC (57) ABSTRACT

Two sets of disk drives are mounted in a grid arrangement onto a backplane to form a removable multi-disk drive unit for a high capacity disk storage system. The removable units may be mounted into an enclosure that contains a RAID controller. The disk drives are mounted such that the longest edge of the disk drive is perpendicular to the plane of the backplane.

16 Claims, 5 Drawing Sheets

DISK STORAGE SYSTEM WITH REMOVABLE ARRAYS OF DISK DRIVES

CROSS REFERENCE TO RELATED APPLICATIONS

This application is simultaneously filed with U.S. patent application Ser. No. 10/660,889 entitled "Data Storage System with a Removable Backplane Having an Array of Disk Drives", by Mohamad El-Batal, et al, and U.S. patent application Ser. No. 10/660,888 entitled "Storage Recovery Using a Delta Log", by Mohamad El-Batal, et al, the entire contents of which are hereby specifically incorporated by reference for all they disclose and teach.

BACKGROUND OF THE INVENTION a. Field of the Invention

The present invention pertains to data storage systems and more specifically to the mechanical configuration of data storage systems having multiple disk drives.

b. Description of the Background

Storage systems with multiple disk drives are a mainstay of modern data storage systems. Technology such as RAID, Redundant Array of Independent Disks, is being commercialized into many different platforms. In very high capacity disk storage systems, it is desirable to have as much storage in as small a space as possible. Typically, very large data storage systems may be rack mounted and afford some serviceability for the disk drives, as the disk drives are often a point of failure for the system. The disk drive is considered a point of failure because an internal mechanical failure of the disk drive has a high likelihood of being catastrophic where all the data from the disk drive may be lost.

RAID technology incorporates two main techniques for ensuring that data is not lost in the event of a single disk failure. The first technique is mirroring wherein a complete copy of all the data on one disk is kept on a second disk. The mirroring technique is known generically as RAID 1. The second technique is where data from multiple disks may be used to compute parity data that is stored on another disk. In the event of a single disk failure, the failed disk may be replaced and reconstructed using the data of the other drives and the parity data. The parity technique is known in various forms, with popular forms being known as RAID 3 or RAID 5.

Many systems utilize both mirroring and parity techniques to ensure the recoverability of the data. For example, a system may include two identical sets of RAID 5 disk arrays may be set up as a mirror of each other. A mirrored system may allow one half of the system to be serviced while the other half performs all of the data serving duties without having to shut off the entire system. Another benefit of mirrored systems is to minimize the number of single points of failure for the entire system. By having a redundant set of components, the failure of one of the components may allow the system to operate while service is pending or being performed.

In some storage solutions, many disk drives are used to store data. Each disk drive may be replaceable in the event of failure. In making each disk drive individually replaceable, a rack mounted storage system may occupy a large amount of vertical rack space while underutilizing the depth of the rack. Such systems may not efficiently use the rack space.

It would therefore be advantageous to provide a disk array that was compact while housing a high number of disk drives. It would be further advantageous to provide a disk array that minimized the number of single points of failure for the entire disk array system. It would be still further advantageous to provide a disk array that was easily and quickly serviceable.

SUMMARY OF THE INVENTION

The present invention overcomes the disadvantages and limitations of previous solutions by providing a system and method for a disk based data storage system that has two sets of disk arrays that are mounted on separate backplanes. The backplanes and disk arrays are independent of each other such that the data storage system may function while one of the backplanes and disk arrays is removed for service. In some embodiments, one backplane may be placed into an enclosure rotated 180 degrees from the second backplane.

An embodiment of the present invention may therefore comprise a storage system with multiple disk drives comprising: an enclosure; an interface board having a first backplane interface connector and a second backplane interface connector, the interface board being mounted in the enclosure, the interface board being substantially planar and defining an interface board plane; a first and second backplane having a plurality of disk drive interface connectors and a backplane interface mating connector capable of mating with one of the first and second backplane interface connectors, the plurality of disk drive interface connectors being arranged in a plurality of rows and a plurality of columns, the first and second backplane being substantially planar and defining a first and second backplane plane; a first set of disk drives electrically connected to the first backplane through the plurality of disk drive interface connectors, each of the first set of disk drives having a longest edge defining a long axis, the long axis being oriented perpendicular to the first backplane plane; a second set of disk drives electrically connected to the second backplane through the plurality of disk drive interface connectors, each of the second set of disk drives having a longest edge defining a long axis, the long axis being oriented perpendicular to the second backplane plane; a first guiding mechanism mounted in the enclosure, the first guiding mechanism defining a first axis of insertion, the first axis of insertion being substantially perpendicular to the interface board plane, the first guiding mechanism being arranged to guide the first backplane into the enclosure such that the first backplane electrically connects to the first backplane interface connector such that the first backplane plane is substantially perpendicular to the interface plane, the first backplane and the first set of disk drives being removable from the enclosure as a first single unit; and a second guiding mechanism mounted in the enclosure, the second guiding mechanism defining a second axis of insertion, the second axis of insertion being substantially perpendicular to the interface board plane, the second guiding mechanism being arranged to guide the second backplane into the enclosure such that the second backplane electrically connects to the second backplane interface connector such that the second backplane plane is substantially perpendicular to the interface plane, the second backplane and the second set of disk drives being removable from the enclosure as a second single unit.

Another embodiment of the present invention may comprise method for constructing a storage system with multiple disk drives comprising: providing an enclosure; providing an interface board having a first backplane interface connector and a second backplane interface connector, the interface board being substantially planar and defining an interface board plane; mounting the interface board in the enclosure; providing a first and second backplane having a plurality of disk drive interface connectors and a backplane interface mating connector capable of mating with one of the first and second backplane interface connectors, the plurality of disk drive interface connectors being arranged in a plurality of rows and a plurality of columns, the first and second backplane being substantially planar and defining a first and second backplane plane; providing a plurality of disk drives; electrically connecting a first set of disk drives to the first backplane through the plurality of disk drive interface connectors, each of the first set of disk drives having a longest edge defining a long axis, the long axis being oriented perpendicular to the first backplane plane; electrically connecting a second set of disk drives to the second backplane through the plurality of disk drive interface connectors, each of the second set of disk drives having a longest edge defining a long axis, the long axis being oriented perpendicular to the second backplane plane; providing a first guiding mechanism defining a first axis of insertion; mounting the first guiding mechanism in the enclosure such that the first axis of insertion is substantially perpendicular to the interface board plane, the first guiding mechanism being arranged to guide the first backplane into the enclosure such that the first backplane electrically connects to the first backplane interface connector such that the first backplane plane is substantially perpendicular to the interface plane, the first backplane and the first set of disk drives being removable from the enclosure as a first single unit; providing a second guiding mechanism defining a second axis of insertion; mounting the a second guiding mechanism in the enclosure such that the second axis of insertion is substantially parallel to the second axis of insertion, the second guiding mechanism being arranged to guide the second backplane into the enclosure such that the second backplane electrically connects to the second backplane interface connector such that the second backplane plane is substantially perpendicular to the interface plane, the second backplane and the second set of disk drives being removable from the enclosure as a second single unit; inserting the first backplane and the first set of disk drives into the enclosure using the first guiding mechanism; and inserting the second backplane and the second set of disk drives into the enclosure using the second guiding mechanism.

The advantages of the present invention are that more data may be stored in a multiple disk enclosure than with previous solutions. Further, the mirrored set of backplane and disk arrays may be separately serviced while keeping the overall data storage system fully functioning. Some embodiments may have a high degree of symmetry and overlap that may reduce the number of single, points of failure for the entire data storage system.

DETAILED DESCRIPTION OF THE INVENTION

Figure 1:
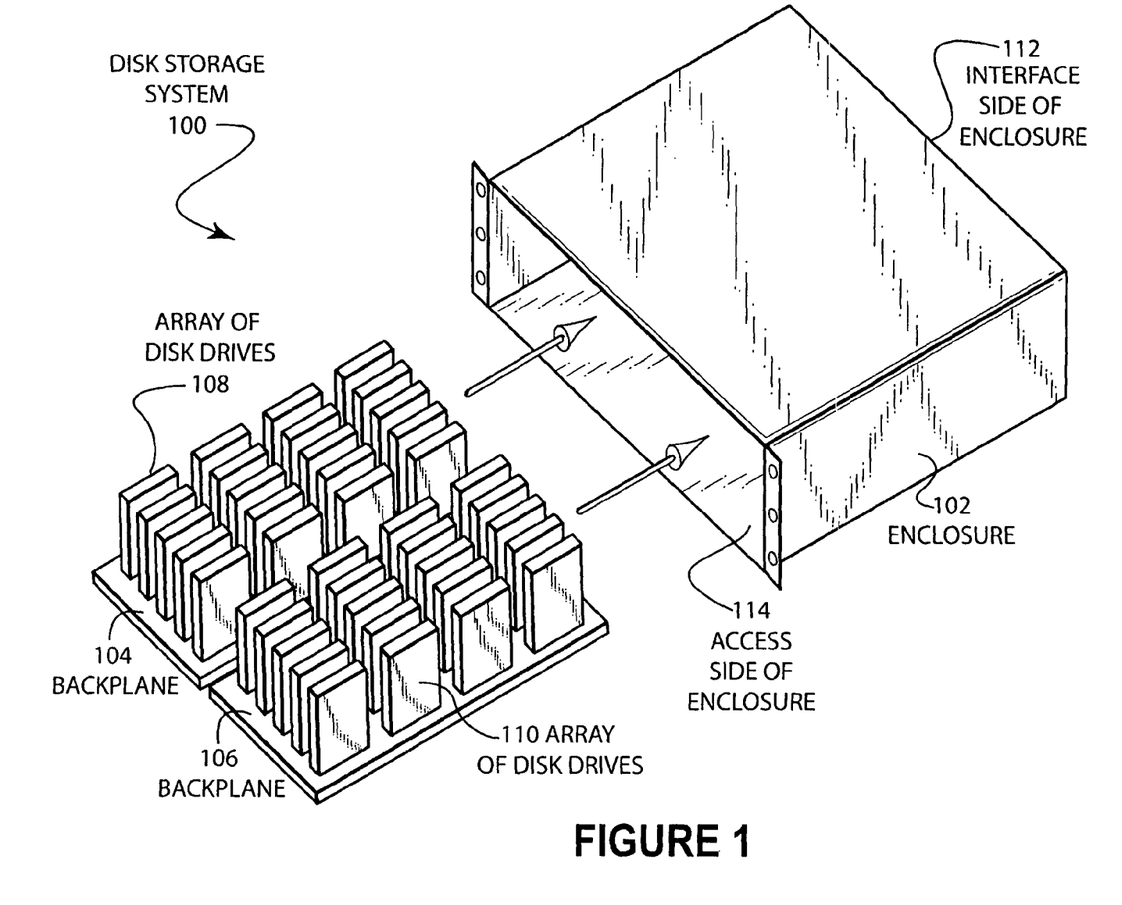
FIG. 1 is an illustration of an embodiment of the present invention showing a disk array.

FIG. 1 illustrates an embodiment 100 of the present invention showing a disk storage system. An enclosure 102 may contain removable backplanes 104 and 106. Backplane 104 has an array 108 of disk drives while backplane 106 has an array 110 of disk drives. The enclosure 102 has an interface side 112 and an access side 114.

The embodiment 100 has two removable backplanes 104 and 106 on which are mounted an array of disk drives. By mounting the disk drives to a removable backplane, several rows of disk drives may be placed into the enclosure 102 while allowing periodic service to occur.

The two separate arrays of disks 108 and 110 may be controlled by a RAID controller or other controller. In some cases, an interface within the enclosure 102 may serve to route connections from the interface side 112 of the enclosure to the individual disk drives. In other cases, intelligent control may be used within the enclosure to manage the multitude of disk drives. Such intelligent control may involve any of the various forms of RAID control or any other switching or management of the disk drives.

The arrays of disks 108 and 110 may each contain at least one data storage device. In some embodiments, an array of disks 108 may contain disk drives arranged in a row and column arrangement, while in other embodiments, several clusters of disk drives may be grouped together in a disk array 108. Various configurations and mechanical arrangements may be contemplated by those skilled in the art while keeping within the spirit and intent of the present invention.

When the embodiment 100 is used in a mirrored RAID system, the disk array 108 may have a mirrored image of the data on the second disk array 110. In some embodiments with mirrored RAID images, one of the backplanes 108 or 110 may be removed for service while the other backplane may operate to store and retrieve data.

Figure 2:
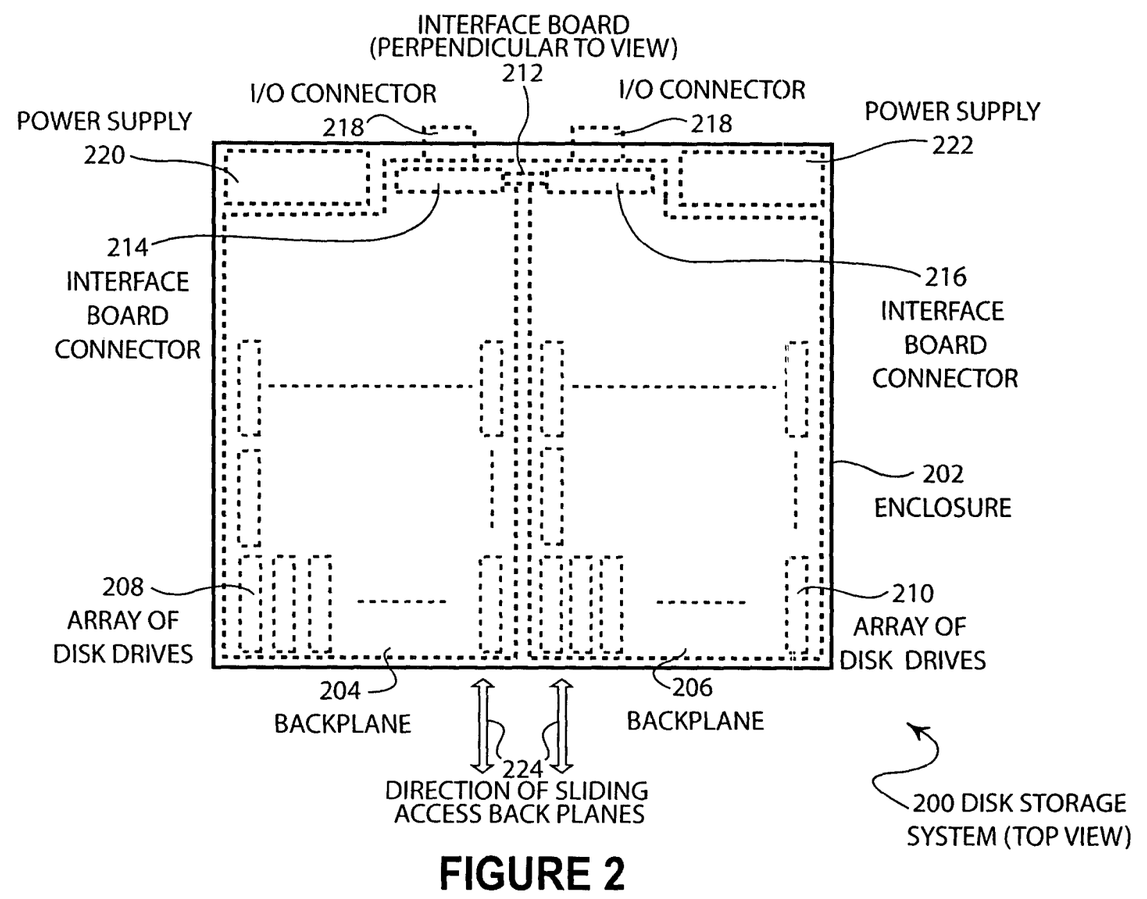
FIG. 2 is a top view illustration of another embodiment of the present invention showing a disk array.

FIG. 2 illustrates a top view of an embodiment 200 of the present invention showing a disk storage system. An enclosure 202 contains backplanes 204 and 206. Backplane 204 has an array of disk drives 208 as backplane 206 has an array of disk drives 210. An interface board 212 has an interface board connector 214 that electrically connects to the backplane 204. Likewise, interface board connector 216 electrically connects to the backplane 206. The interface board 212 has I/O connectors 218 that allow communication to other devices. Power supplies 220 and 222 are also mounted in the enclosure 202. The backplanes 204 and 206 may be installed and removed from the enclosure 202 in the direction depicted by arrows 224.

The interface board 212 is illustrated as perpendicular to the plane of the view. In some embodiments, such an orientation may afford the designer a convenient method for connecting the various cables, connectors, and printed circuit boards that make up an embodiment.

The interface board 212 may contain routing, switching, and other functions for connecting input and output signals on the I/O connectors 218 to the various disk drives. In some embodiments, the interface board 212 may include merely signal routing. In other embodiments, the interface board 212 may include intelligent control such as switching or a RAID controller.

In some embodiments, several separate printed circuit boards may be used inside the enclosure 202 to provide the functionality of RAID control or other switching or intelligent control. Such additional boards may be mounted parallel, perpendicular, or in any orientation with respect to the interface board 212. Such boards may be adapted to directly interface with the backplanes 204 or 206 or may be daughter boards to the interface board 212.

In the embodiment 200, the backplane 204 may be substantially a mirror image of backplane 206. In other words, backplane 204 may be left handed while backplane 206 may be right handed. In other embodiments, the backplanes 204 and 206 may be constructed as identical and interchangeable boards. Those skilled in the arts will appreciate that various layouts may be contemplated while keeping within the spirit and intent of the present invention.

The power supplies 220 and 222 may include fans that are capable of drawing or pushing air through the enclosure 202. When air flow is in the direction of the arrows 224, those skilled in the art will appreciate that the orientation of the disk drives as shown in the embodiment 200 will afford good airflow through the enclosure.

The orientation of the disk drives may be arranged in any convenient manner. In the embodiment 200, all of the disk drives are arranged in a rectangular grid with the disk drives in line with each other. In other embodiments, the disk drives may be canted or perpendicular to the arrows 224. The disk drives may be placed in any type of pattern that may be contemplated.

The power supplies 220 and 222 may provide separate connectors that engage the backplanes 204 and 206. In some embodiments, the power supply connections may be routed through the interface board 212. While one power supply may be sufficient to operate the disk array 200, two or more power supplies may be used to provide backup and redundancy in the event of the power supply failure. Since power supplies typically have a fan which, as a mechanical moving part, has a relatively high probability of failure, two or more power supplies may be connected such that the failure of one power supply still allows the embodiment 200 to function while repair of the power supply is scheduled.

Various mechanical guidance systems (not shown) may be used to facilitate the entry and removal of the backplanes 204 and 206. For example, such guidance systems may be as simple as a track or surface on which the backplane is slid into the enclosure 202 until the electrical connectors between the backplane and interface board 212 are engaged. Other guidance systems may incorporate bearings, tracks, extension slides, or other mechanisms attached to the enclosure 202 and/or the backplanes 204 and 206.

In some embodiments, the backplanes 204 and 206 may be completely separable and removable from the enclosure 202. In other embodiments, the backplanes 204 and 206 may be mounted on a retained mechanism whereby the backplanes 204 and 206 may be moved out of the enclosure 202 for service, but the backplanes 204 and 206 may still be attached to the enclosure 202. Such an embodiment may incorporate extension slides that permanently attach the backplanes 204 and 206 to the enclosure 202.

Figure 3:
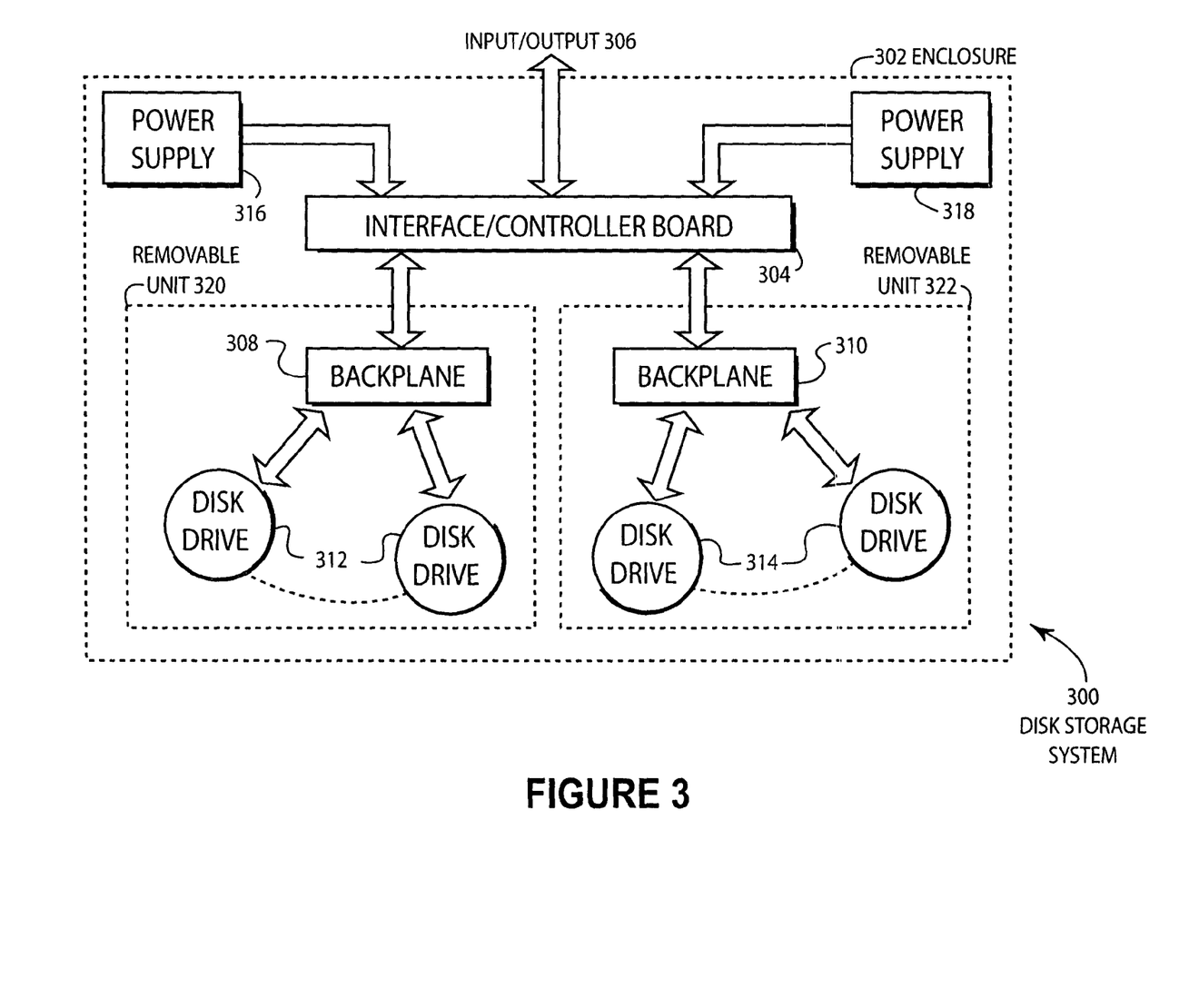
FIG. 3 is an illustration of a third embodiment of the present invention showing a disk array.

FIG. 3 illustrates an embodiment 300 of the present invention showing the interconnections of various components within a disk storage system. The enclosure 302 contains an interface/controller board 304 that connects to other devices through input/output signals 306. The interface/controller board 304 engages backplanes 308 and 310. Backplane 308 connects to a plurality of disk drives 312. Backplane 310 connects to a plurality of disk drives 314.

The interface/controller board 304 may also interface to power supplies 316 and 318. The backplane 308 and the disk drives 312 make up a removable unit 320. The backplane 310 and the disk drives 314 make up a removable unit 322.

The electrical and communication connections between the various components may be through cables, direct plug in of mating connectors, or by any other electrical connection mechanism whether or not such mechanism is removable, with the exception of the connections between the backplanes and the interface/controller board 304. For example, the power supplies 316 and 318 may be integrally soldered to the interface/controller board 304, may be connected by direct plug-in connectors, or may be cabled.

The various disk drives 312 and 314 may be connected to the respective backplanes 308 and 310 by directly plugging a connector on the disk drive into a connector that is integral to the backplane. Directly plugging the disk drive onto the backplane eliminates a cable which is a point of failure as well as an additional cost.

Other embodiments may use a cable or other non-direct plugging connection mechanism to communicate electrical signals from the backplane to the disk drives.

For the connections between the backplanes 308 and 310 and the interface/controller board 304, there exists a separable connector. In some embodiments, the connector may be a specially designed connector for blind mating applications. In other embodiments, various guide pins, locating features, and other mechanical devices may be used to allow the removable units 320 and 322 to slidingly engage the interface/controller board 304.

The removable units 320 and 322 may or may not be interchangeable. Various mechanical configurations of the removable units 320 and 322 may be contemplated by those skilled in the arts while keeping within the spirit and intent of the present invention.

Figure 4:
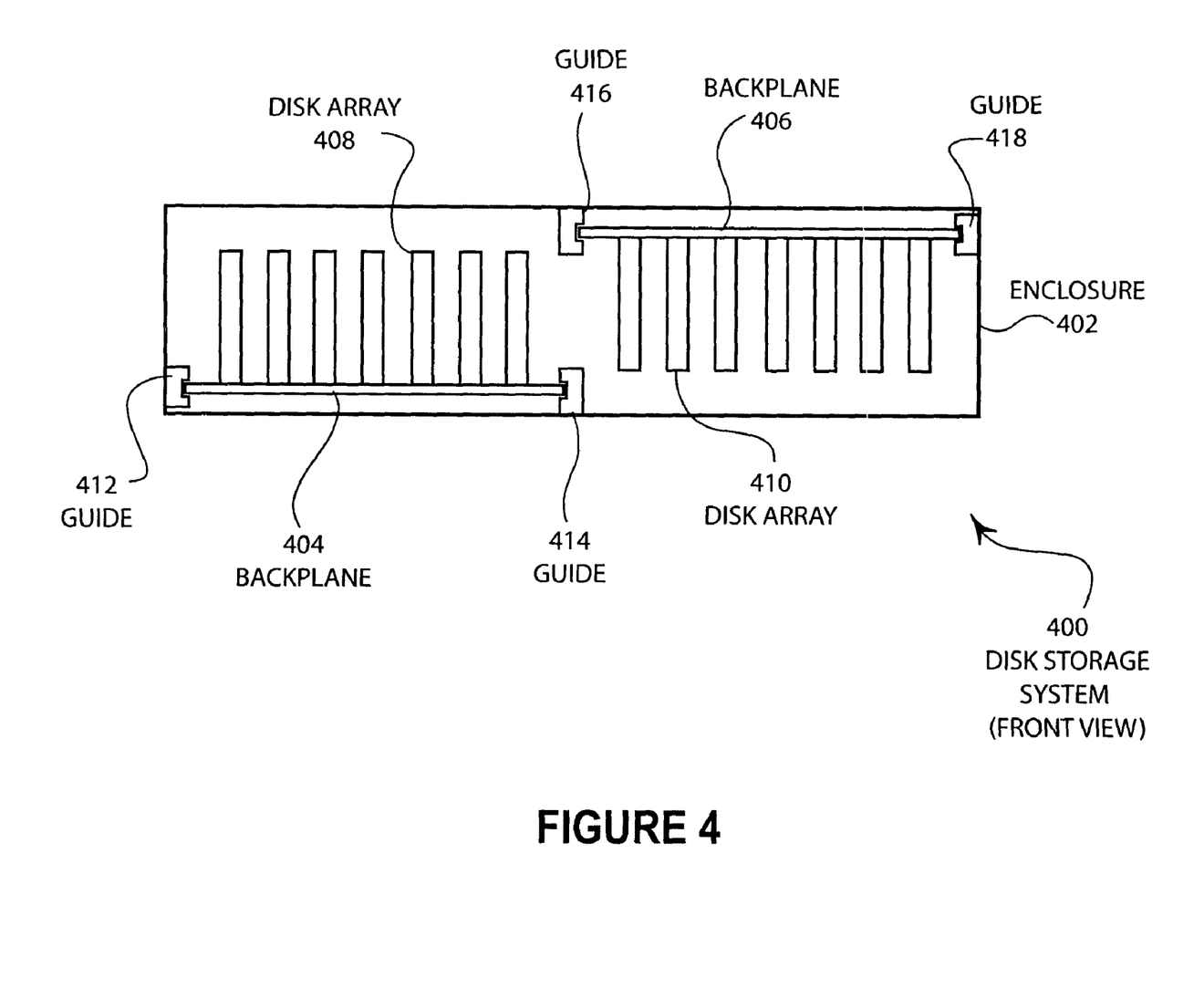
FIG. 4 is an embodiment of the present invention showing a front view of a disk storage system, wherein the backplanes are inserted into the enclosure inn an upside-down relationship to one another.

FIG. 4 illustrates an embodiment 400 of the present invention showing a front view of a disk storage system. The enclosure 402 contains backplanes 404 and 406. Backplane 404 has a disk array 408 and backplane 406 has a disk array 410. Backplane 404 is held in place by guides 412 and 414. Backplane 406 is held in place by guides 416 and 418.

In the embodiment 400, the backplane 404 with the disk array 408 may be identical to backplane 406 and disk array 410. In the present embodiment, the backplane 406 is inserted into the enclosure 402 upside down in relation to backplane 404.

The symmetry of the embodiment 400 may allow an interface board (not shown) to have a certain symmetry whereby the signals sent to the two backplane boards are separate and easy to route. Such symmetry may reduce the number of layers that are contained in the interface board and thereby simplify the overall design, lower the cost, and increase the mean time to failure for the system.

Figure 5:
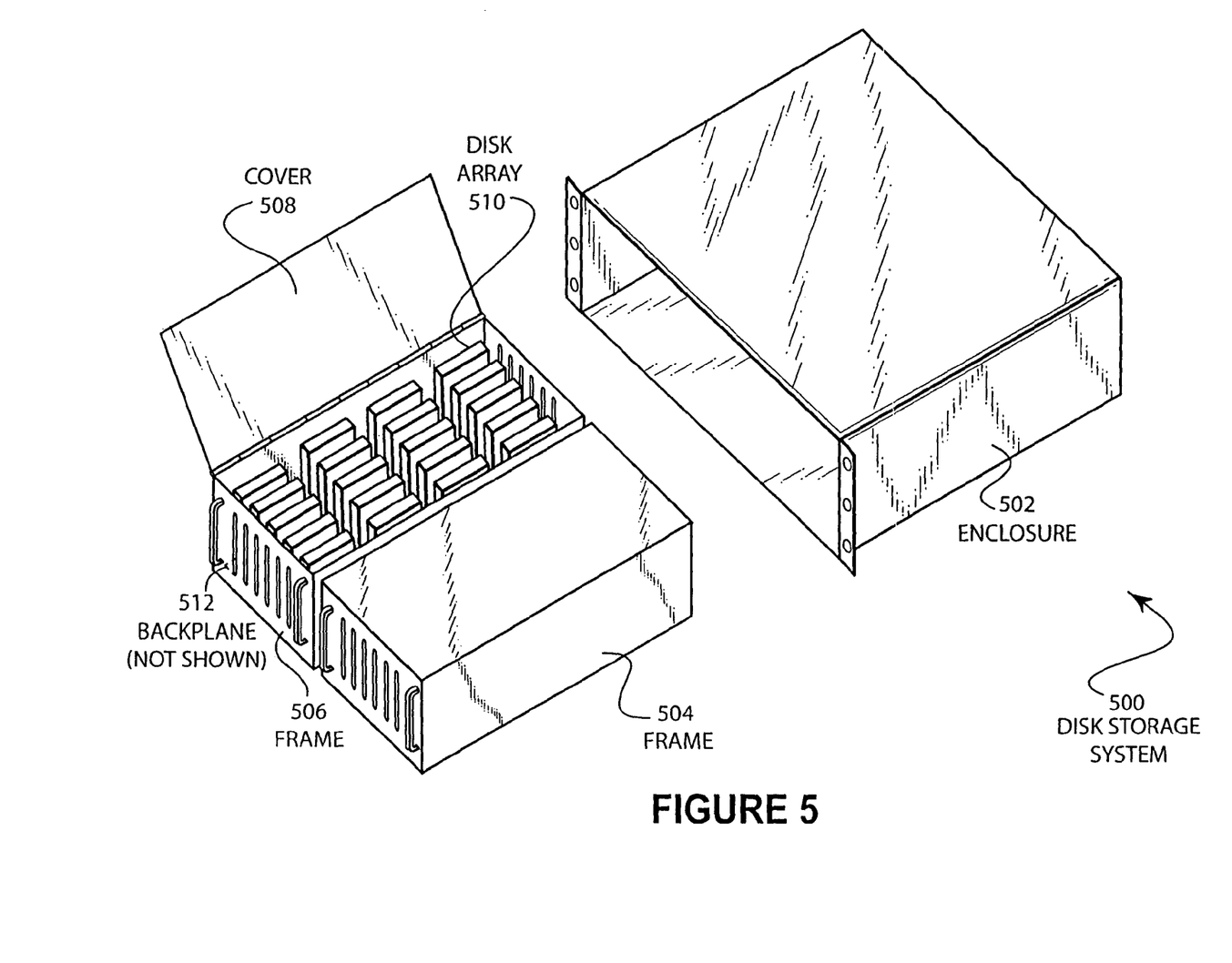
FIG. 5 is an embodiment of the present invention showing a disk storage system, wherein frames containing disk arrays are adapted to be inserted into the enclosure.

FIG. 5 illustrates an embodiment 500 of the present invention showing a disk storage system. An enclosure 502 is adapted to receive frames 504 and 506. Frame 506 may contain a disk array 510 and backplane 512 and may be enclosed with a cover 508.

The frames 504 and 506 may be sealed units that may be removed and replaced with no serviceable parts inside. For such embodiments, it may be desirable to include one or more spare disk drives that can be used when another disk drive fails. For example, if the frame 504 contained 20 individual drives, four or five disk drives may be designated spare drives. When one of the other 15 or 16 normal drives has a failure, one of the four or five spare drives would be activated in place of the failed drive. By using such techniques, it is conceivable that a frame, 504 may be designed without internal serviceable parts.

In another embodiment, the frame 506 may be designed for simple and easy replacement of failed drives. For example, the frame 506 may be mounted on extension rails. When service is to be performed, the frame 506 may be extended from the enclosure 502, the cover 508 opened, and a failed disk may be replaced. In some embodiments, the cover 508 would not be necessary.

Supporting frames or shock absorbing mechanisms may be used to support and hold the various disk drives in place. Such mechanisms may be designed to protect a frame with its disk drives from shipping or other environmental mechanical excitement. Such devices may be integral in the frame 504 or may be separate parts.

The frames 504 and 506 may be designed with sufficient venting holes to facilitate airflow through the enclosure. Those skilled in the art will appreciate that airflow for a rack mounted embodiment may be from the front to the back of the enclosure while for other applications, side or top venting of the enclosure may be appropriate.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A storage system with multiple disk drives comprising:
   an enclosure;
   an interface board having a first backplane interface connector and a second backplane interface connector, said interface board being mounted in said enclosure, said interface board being substantially planar and defining an interface board plane;
   a first and second backplane having a plurality of disk drive interface connectors and a backplane interface mating connector capable of mating with one of said first and second backplane interface connectors, said plurality of disk drive interface connectors being arranged in a plurality of rows and a plurality of columns, said first and second backplane being substantially planar and defining a first and second backplane plane;
   a first set of disk drives electrically connected to said first backplane through said plurality of disk drive interface connectors, each of said first set of disk drives having a longest edge defining a long axis, said long axis being oriented perpendicular to said first backplane plane;
   a second set of disk drives electrically connected to said second backplane through said plurality of disk drive interface connectors, each of said second set of disk drives having a longest edge defining a long axis, said long axis being oriented perpendicular to said second backplane plane;
   a first power supply connected to said first backplane, but not to said second backplane;
   a second power supply connected to said second backplane, but not to said first backplane;
   a first guiding mechanism mounted in said enclosure, said first guiding mechanism defining a first axis of insertion, said first axis of insertion being substantially perpendicular to said interface board plane, said first guiding mechanism being arranged to guide said first backplane into said enclosure such that said first backplane electrically connects to said first backplane interface connector such that said first backplane plane is substantially perpendicular to said interface plane, said first backplane and said first set of disk drives being removable from said enclosure as a first single unit; and
   a second guiding mechanism mounted in said enclosure, said second guiding mechanism defining a second axis of insertion, said second axis of insertion being substantially perpendicular to said interface board plane, said second guiding mechanism being arranged to guide said second backplane into said enclosure such that said second backplane electrically connects to said second backplane interface connector such that said second backplane plane is substantially perpendicular to said interface plane, said second backplane and said second set of disk drives being removable from said enclosure as a second single unit.

2. The storage system of claim 1 further comprising:
   a first frame into which is mounted said first backplane and said first set of disk drives; and
   a second frame into which is mounted said second backplane and said second set of disk drives.

3. The storage system of claim 1 wherein said first backplane is substantially a mirror image of said second backplane.

4. The storage system of claim 1 wherein said first backplane and said second backplane are identical and interchangeable.

5. The storage system of claim 4 wherein said first backplane is inserted into said enclosure in an inverted relationship with respect to said second backplane.

6. The storage system of claim 1 wherein said interface board comprises a RAID controller.

7. The storage system of claim 6 wherein said first set of disk drives is a RAID mirror of said second set of disk drives.

8. The storage system of claim 7 wherein one of said first backplane and said second backplane may be removed from said enclosure while said storage system is operable.

9. A method for constructing a storage system with multiple disk drives comprising:
   providing an enclosure;
   providing an interface board having a first backplane interface connector and a second backplane interface connector, said interface board being substantially planar and defining an interface board plane;
   mounting said interface board in said enclosure;
   providing a first and second backplane having a plurality of disk drive interface connectors and a backplane interface mating connector capable of mating with one of said first and second backplane interface connectors, said plurality of disk drive interface connectors being arranged in a plurality of rows and a plurality of columns, said first and second backplane being substantially planar and defining a first and second backplane plane;
   providing a plurality of disk drives;
   electrically connecting a first set of disk drives to said first backplane through said plurality of disk drive interface connectors, each of said first set of disk drives having a longest edge defining a long axis, said long axis being oriented perpendicular to said first backplane plane;

electrically connecting a second set of disk drives to said second backplane through said plurality of disk drive interface connectors, each of said second set of disk drives having a longest edge defining a long axis, said long axis being oriented perpendicular to said second backplane plane;

electrically connecting a first power supply to said first backplane, but not to said second backplane;

electrically connecting a second power supply to said second backplane but not to said first backplane;

providing a first guiding mechanism defining a first axis of insertion;

mounting said first guiding mechanism in said enclosure such that said first axis of insertion is substantially perpendicular to said interface board plane, said first guiding mechanism being arranged to guide said first backplane into said enclosure such that said first backplane electrically connects to said first backplane interface connector such that said first backplane plane is substantially perpendicular to said interface plane, said first backplane and said first set of disk drives being removable from said enclosure as a first single unit;

providing a second guiding mechanism defining a second axis of insertion; mounting said a second guiding mechanism in said enclosure such that said second axis of insertion is substantially perpendicular to said interface board plane, said second guiding mechanism being arranged to guide said second backplane into said enclosure such that said second backplane electrically connects to said second backplane interface connector such that said second backplane plane is substantially perpendicular to said interface plane, said second backplane and said second set of disk drives being removable from said enclosure as a second single unit;

inserting said first backplane and said first set of disk drives into said enclosure using said first guiding mechanism; and inserting said second backplane and said second set of disk drives into said enclosure using said second guiding mechanism.

10. The method of claim 9 further comprising:

providing a first frame;

providing a second frame;

mounting said first backplane and said first set of disk drives into said first frame; and mounting said second baa second backplane and said second set of disk drives into said second frame.

11. The method of claim 9 wherein said first backplane is substantially a mirror image of said second backplane.

12. The method of claim 9 wherein said first backplane and said second backplane are identical and interchangeable.

13. The method of claim 12 wherein said first backplane is inserted into said enclosure in an inverted relationship with respect to said second backplane.

14. The method of claim 9 wherein said interface board comprises a RAID controller.

15. The method of claim 14 wherein said first set of disk drives is a RAID mirror of said second set of disk drives.

16. The method of claim 15 wherein one of said first backplane and said second backplane may be removed from said enclosure while said storage system is operable.

* * * * *